(12) United States Patent
Bohling et al.

(10) Patent No.: US 8,710,133 B2
(45) Date of Patent: Apr. 29, 2014

(54) STABLE AQUEOUS COMPOSITE COMPOSITIONS

(75) Inventors: James Charles Bohling, Lansdale, PA (US); John William Hook, III, Warminster, PA (US); Melinda H. Keefe, Willow Grove, PA (US); Arthur Grigorievich Kravchenko, Philadelphia, PA (US); Jeffrey J. Moretti, Bordentown, NJ (US); Judith Niece Varner, Lansdale, PA (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 258 days.

(21) Appl. No.: 13/218,977

(22) Filed: Aug. 26, 2011

(65) Prior Publication Data

US 2012/0058278 A1   Mar. 8, 2012

Related U.S. Application Data

(60) Provisional application No. 61/402,770, filed on Sep. 3, 2010.

(51) Int. Cl.
*B01F 3/12* (2006.01)
*C08K 3/22* (2006.01)

(52) U.S. Cl.
USPC .......................................... 524/431; 524/547

(58) Field of Classification Search
USPC .................................. 524/431, 547; 523/205
See application file for complete search history.

(56) References Cited

U.S. PATENT DOCUMENTS

| 5,385,960 | A | 1/1995 | Emmons et al. |
| 6,080,802 | A | 6/2000 | Emmons et al. |
| 6,492,451 | B1 | 12/2002 | Dersch et al. |
| 7,179,531 | B2 | 2/2007 | Brown et al. |
| 7,285,590 | B2 | 10/2007 | Holub et al. |
| 2003/0018103 | A1 | 1/2003 | Bardman et al. |
| 2004/0054063 | A1 | 3/2004 | Brown et al. |
| 2005/0222299 | A1 | 10/2005 | Garzon et al. |
| 2007/0021536 | A1 | 1/2007 | Pressley et al. |
| 2008/0146724 | A1 | 6/2008 | Bohling et al. |
| 2009/0326135 | A1 | 12/2009 | Nair et al. |
| 2010/0120945 | A1 | 5/2010 | Sahlberg et al. |

FOREIGN PATENT DOCUMENTS

| EP | 0625541 A2 | 11/1994 |
| EP | 2166044 A1 | 3/2010 |
| JP | 7070505 A | 3/1995 |
| JP | 2007023279 A | 2/2007 |

OTHER PUBLICATIONS

Conversion between Stormer Viscometer Krebs Units and Viscosity Cup Drain Time, by Gardco Paul N. Gardner Company, Inc. downloaded from http://www.gardco.com/stormer_krebsconv_PU-G271.pdf on Jul. 30, 2013 (p. 3 of 4).*
Partial European Search Report issued in EP 11 17 7866, dated Jan. 9, 2012.

* cited by examiner

*Primary Examiner* — Vu A Nguyen
(74) *Attorney, Agent, or Firm* — Ronald D. Bakule; Karl E. Stauss

(57) ABSTRACT

This invention provides a method for forming a stable aqueous composition including composite particles by admixing TiO2 particles and adsorbing emulsion polymer particles at or below the critical composite ratio to an equilibrated viscosity range of from 200 cps to 4000 cps. Also provided is a method for forming a stable aqueous composition including composite particles by admixing TiO2 particles and adsorbing emulsion polymer particles at a mixing intensity of greater than 2 hp/kgal. A method for providing a coating including composite particles is also included.

6 Claims, No Drawings

STABLE AQUEOUS COMPOSITE COMPOSITIONS

This invention relates to a method for preparing a stable aqueous composition including composite particles by admixing TiO2 particles and adsorbing emulsion polymer particles at or below the critical composite ratio to an equilibrated viscosity range of from 200 cps to 4000 cps. The invention also relates to a method for forming a stable aqueous composition including composite particles including: admixing TiO2 particles and adsorbing emulsion polymer particles at a mixing intensity of greater than 2 hp/kgal. A method for providing a coating is also provided.

Titanium dioxide (TiO2) is an expensive component of many paints. The efficacy of the TiO2 as a hiding pigment is reduced when TiO2 particles are allowed to come too close together on film formation and drying. It has been disclosed that the spacing of TiO2 and its resultant efficiency can be improved and enforced by employing an adsorbing emulsion polymer. A composite particle having a central TiO2 particle bearing a plurality of adsorbed emulsion polymer particles engenders more efficient use of TiO2 as a hiding pigment.

U.S. Pat. No. 7,179,531 discloses polymer particles having select functional or absorbing groups useful for preparing organic-inorganic composite particles that are suitable for providing dried coatings with improved hiding. The stability of aqueous compositions comprising composite particles is subject to improvement. We have found that admixing TiO2 particles and adsorbing emulsion polymer particles at or below the critical composite ratio to an equilibrated viscosity range of from 200 cps to 4000 cps provides a desired level of stability. We have also found that admixing TiO2 particles and adsorbing emulsion polymer particles at a mixing intensity of greater than 2 hp/kgal. provides a desired level of stability.

In a first aspect of the present invention, there is provided a method for preparing a stable aqueous composition comprising composite particles comprising: admixing TiO2 particles and adsorbing emulsion polymer particles at or below the critical composite ratio to an equilibrated viscosity range of from 200 cps to 4000 cps.

In a second aspect of the present invention there is provided a method for forming a stable aqueous composition comprising composite particles comprising: admixing TiO2 particles and adsorbing emulsion polymer particles at a mixing intensity of greater than 2 hp/kgal.

In a third aspect of the present invention, there is provided a method for forming a coating comprising (a) forming said aqueous composition of the first or second aspects of the present invention; (b) applying said aqueous composition to a substrate; and (c) drying, or allowing to dry, said applied aqueous composition.

The first and second aspects of the present invention are directed to a method for preparing a stable aqueous composition including composite particles. By "aqueous" herein is meant water and from 0% to 30%, by wt. based on the weight of the medium, of water-miscible compound(s). By "stable aqueous composition" herein is meant that the aqueous composition has less than 1000 ppm of grit, preferably less than 500 ppm of grit, and more preferably less than 250 ppm of grit.

"Composite particles" as defined herein each include a central TiO2 particle having a plurality of emulsion polymer particles adsorbed on the surface of the TiO2 particle. The composite particles herein are formed by admixing TiO2 particles and adsorbing emulsion polymer particles. By "TiO2 particle" herein is meant a particle composed predominantly of TiO2, including rutile TiO2 and anatase TiO2. The TiO2 may have a uniform composition or a heterogeneous composition with two or more phases. Typically, TiO2 can have at least one coating of one or more of silica, alumina, zinc oxide, and zirconia. We have found that specific types of TiO2 require different levels of adsorbing monomer (P-acid monomer) in the emulsion polymer. For example, we have found that a TiO2 grade with a relatively high ratio of Al:Si requires adsorbing emulsion polymer incorporating much less copolymerized adsorbing monomer than a TiO2 grade with a lower Al:Si ratio.

The adsorbing emulsion polymer particles typically include, as copolymerized units, at least one monomer including an adsorbing group selected from phosphorus acid groups, phosphorous acid full ester groups, and polyacid sidechain groups; and salts thereof. The adsorbing emulsion polymer particles typically include, as copolymerized units, from 0.5 to 5%, preferably from 1 to 4%, more preferably from 1% to 2.5%, by weight based on emulsion polymer weight, monomer selected from the group consisting of Phosphorous acid monomers, Phosphorus acid full-ester monomers, acid macromonomers; and salts thereof; and at least one second monoethylenically unsaturated monomer.

By Phosphorous acid monomer ("P-acid monomer"), herein is meant a phosphorus-containing acid monomer, the monomer containing at least one ethylenic unsaturation and a phosphorus acid group. The phosphorus acid monomer may be in the acid form or as a salt of the phosphorus acid groups. Examples of phosphorus acid monomers include:

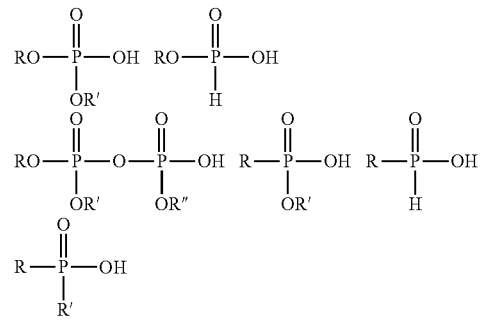

wherein R is an organic group containing an acryloxy, methacryloxy, or a vinyl group; and R' and R" are independently selected from H and a second organic group. The second organic group may be saturated or unsaturated. Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl) fumarate or itaconate, derivatives of (meth)acrylic acid esters, such as, for examples phosphates of hydroxyalkyl(meth)acrylates including 2-hydroxyethyl (meth)acrylate, 3-hydroxypropyl (meth)acrylates, and the like. Other suitable phosphorous acid monomers include $CH_2=C(R)-C(O)-O-(R1O)_n-P(O)(OH)_2$, where R=H or CH3 and R1=alkyl, such as the methacrylates SIPOMER™ PAM-100, SIPOMER™ PAM-200, and SIPOMER™ PAM-400 and the acrylate, SIPOMER™ PAM-300, available from Rhodia, Inc. Other suitable phosphorus acid monomers are phosphonate functional monomers, disclosed in WO 99/25780 A1, and include vinyl phosphonic acid, allyl phosphonic acid, 2-acrylamido-2-methylpropanephosphonic acid, α-phosphonostyrene, 2-methylacrylamido-2-methylpropanephosphonic acid. Further suitable phosphorus functional monomers are 1,2-ethylenically unsaturated (hydroxy)phosphinylalkyl (meth)acrylate monomers, disclosed in U.S. Pat. No. 4,733,005, and include (hydroxy)phosphinylmethyl methacrylate. Preferred phosphorus acid monomers are dihydrogen phosphate monomers, which include 2-phosphoethyl (meth)acrylate, 2-phosphopropyl (meth)acrylate, 3-phosphopropyl (meth)acrylate, and 3-phospho-2-hydroxypropyl (meth)acrylate. Preferred are 2-phosphoethyl (meth)acrylate, 2-phosphopropyl (meth)acrylate, 3-phosphopropyl (meth)acrylate, 3-phospho-2-hydroxypropyl (meth)acrylate, SIPOMER™ PAM-100, and SIPOMER™ PAM-200.

The adsorbing emulsion polymer particle can include a phosphorus acid full-ester group that is incorporated into the adsorbing emulsion polymer by polymerization of the phosphorus acid full-ester monomer.

The adsorbing emulsion polymer particle can include polyacid sidechain groups that are incorporated into the polymer by polymerization of an acid macromonomer. As used herein, acid macromonomer refers to an oligomer with a terminal unsaturation and having monomers with acid groups as polymerized units. Suitable acid groups include carboxylic acids and phosphorus acids. The terminal unsaturation and the section of the acid macromonomer with the acid groups are attached directly or alternatively, attached through a linker group. Various conventional polymerization methods are suitable for preparing the acid macromonomers including anionic polymerization as disclosed in U.S. Pat. No. 4,158,736; radical polymerization with chain transfer agents such as cobalt complexes as described in U.S. Pat. No. 5,324,879; catalytic chain transfer polymerization with terminally unsaturated acid macromonomers used as chain transfer agents as described in U.S. Pat. No. 5,362,826; and high temperature radical polymerization as described in U.S. Pat. No. 5,710,227.

The at least one copolymerized second ethylenically unsaturated monomer excludes acid group containing monomers such as, for example, P-acid monomer and acid macromonomers and includes, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; (meth)acrylonitrile; and N-alkylol (meth)acrylamide. Optional multiethylenically unsaturated monomers include, for example, allyl (meth)acrylate, diallyl phthalate, butadiene, 1,4-butylene glycol di(meth)acrylate, 1,2-ethylene glycol di(meth)acrylate, 1,6-hexanediol di(meth)acrylate, and divinyl benzene. The use of the term "(meth)" followed by another term such as (meth)acrylate or (meth)acrylamide, as used throughout the disclosure, refers to both acrylates or acrylamides and methacrylates and methacrylamides, respectively.

In certain embodiments of the invention the adsorbing emulsion polymer further includes, as copolymerized units, from 0.05% to 2%, preferably from 0.1% to 1%, and more preferably from 0.1% to 0.6%, by weight, based on the weight of said emulsion polymer, second acid-containing monomer. The second acid-containing monomer excludes P-acid monomer, but includes S-acid monomers and carboxylic acid monomers. Second acid-containing monomers include carboxylic acid monomers such as, for example, acrylic acid, methacrylic acid, crotonic acid, itaconic acid, fumaric acid, maleic acid, monomethyl itaconate, monomethyl fumarate, monobutyl fumarate, and maleic anhydride; and sulfur-containing acid monomers. Preferred second acid-containing monomers are (meth)acrylic acid and styrene sulfonic acid.

In certain embodiments of the invention the adsorbing emulsion polymer further includes, as copolymerized units, from 0.01% to 3%, preferably from 0.1% to 2%, by weight based on the weight of the adsorbing emulsion polymer, aldehyde-reactive group-containing monomer. By "aldehyde-reactive group-containing monomer" is meant herein a monomer which, in a homogeneous solution containing 20% by weight of the monomer and an equimolar amount of formaldehyde at any pH from 1 to 14, will exhibit greater than 10% extent of reaction between the monomer and formaldehyde on a molar basis in one day at 25° C. Included as ethylenically unsaturated aldehyde reactive group-containing monomers are, for example, vinyl acetoacetate, acetoacetoxyethyl (meth)acrylate, acetoacetoxypropyl (meth)acrylate, allyl acetoacetate, vinyl acetoacetamide, acetoacetoxyethyl (meth) acrylamide, 3-(2-vinyloxyethylamino)-propionamide, N-(2-(meth) acryloxyethyl)-morpholinone-2,2-methyl-1-vinyl-2-imidazoline, 2-phenyl-1-vinyl-2-imidazoline, 2-(3-oxazolidinyl)ethyl (meth)acrylate, N-(2-vinoxyethyl)-2-methyloxazolidine, 4,4-dimethyl-2-isopropenyloxazoline, dimethylaminoethyl (meth)acrylate, 2-methyl-5-vinyl-pyridine, 2-vinoxyethylamine, 2-vinoxyethylethylene-diamine, 3-aminopropyl vinyl ether, 2-amino-2-methylpropyl vinyl ether, 2-aminobutyl vinyl ether, tert-butylaminoethyl (meth) acrylate, 2-(meth)acryloxyethyldimethyl-β-propiobetaine, diethanolamine monovinyl ether, o-aniline vinyl thioether, (meth)acryloxyacetamido-ethylethyleneurea, ethyleneureidoethyl (meth) acrylate, (meth)acrylamidoethyl-ethyleneurea, (meth)acrylamidoethyl-ethylenethiourea, N-((meth)acrylamidoethyl)-N-(1-hydroxymethyl)ethyleneurea, N-((meth)acrylamidoethyl)-N-(1-methoxy)methylethyleneurea, N-formamidoethyl-N-(1-vinyl)ethyleneurea, N-vinyl-N-(1-aminoethyl)-ethyleneurea, N-(ethyleneureidoethyl)-4-pentenamide, N-(ethylenethioureido-ethyl)-10-undecenamide, butyl ethyleneureido-ethyl fumarate, methyl ethyleneureido-ethyl fumarate, benzyl N-(ethyleneureidoethyl)fumarate, benzyl N-(ethyleneureido-ethyl)maleamate, N-vinoxyethylethylene-urea, N-(ethyleneureidoethyl)-crotonamide, ureidopentyl vinyl ether, 2-ureidoethyl (meth)acrylate, 2-(3-methylolimidazolidone-2-yl-1) ethyl acrylate, N-acryloxyalkyl oxazolidines, acylamidoalkyl vinyl alkyleneureas, dimethyaminoethyl methacrylate, and ethylenically unsaturated monomers containing aziridene functionality. Preferred is 0.25% to 2%, by weight based on adsorbing emulsion polymer weight, of a copolymerized ureido methacrylate.

The calculated glass transition temperature ("Tg") of the adsorbing emulsion polymer is typically from −20° C. to 50° C., or in the alternative, from −10° C. to 20° C. Tgs of the polymers are calculated herein by using the Fox equation (T. G. Fox, Bull. Am. Physics Soc., Volume 1, Issue No. 3, page 123 (1956)), that is, for calculating the Tg of a copolymer of monomers M1 and M2, $$1/Tg(calc.)=w(M1)/Tg(M1)+w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperature of homopolymers may be found, for example, in "Polymer Handbook", edited by J. Brandrup and E. H. Immergut, Interscience Publishers.

The adsorbing emulsion polymer is a polymer formed by emulsion polymerization in an aqueous medium. The emulsion polymerization techniques typically used in the method for forming the multistage emulsion polymer of the present invention are well known in the art. Conventional surfactants may be used such as, for example, anionic and/or nonionic emulsifiers such as, for example, alkali metal or ammonium alkyl sulfates, alkyl sulfonic acids, fatty acids, phosphate surfactants, and oxyethylated alkyl phenols. The amount of surfactant used is usually 0.1% to 6% by weight, based on the weight of total monomer. Either thermal or redox initiation processes may be used. Conventional free radical initiators, also referred to as catalysts, may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant, also referred to as an activator, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymers. Mixtures of surfactants, initiators, reductants, chain transfer agents, and the like may also be used.

The monomers may be added individually or in monomer mixtures; they may be added neat or as an emulsion in water. In certain embodiments the monomer herein is added in two or more stages.

In certain embodiments the second monoethylenically unsaturated monomer is added throughout the reaction. During a portion of certain embodiments the reaction, or stage, which corresponds to 5% to 50%, preferably from 10% to 45%, and more preferably from 15% to 40%, by weight of the total monomer addition, 75% to 100% of the adsorbing group containing monomer is added concurrently with the second monoethylenically unsaturated monomer. This stage relatively rich in adsorbing group containing monomer is sometimes described as a "pulsed" addition of monomer. In certain embodiments the pulse, or adsorbing group containing monomer-rich stage, is begun at a point wherein from 0% to 65%, preferably from 0% to 50%, and more preferably from 0% to 30%, by weight of the total added monomer has been added. That is, it is preferable that the adsorbing group containing monomer pulse occurs relatively early in the reaction to form the adsorbing emulsion polymer. In such embodiments it is preferred that optional second acid monomers and aldehyde reactive monomers are cofed with the adsorbing group containing monomer.

Additional ingredients such as, for example, free radical initiators, oxidants, reducing agents, chain transfer agents, neutralizers, surfactants, and dispersants may be added prior to, during, or subsequent to any of the stages. Processes yielding polymodal particle size distributions may be employed.

The average particle diameter of the adsorbing emulsion polymer particles is typically from 40 nm to 150 nm, preferably from 50 nm to 130 nm, and more preferably from 75 nm to 115 nm, as measured by a Brookhaven Model BI-90 Particle Sizer supplied by Brookhaven Instrument Corp., Holtsville, N.Y.

The formation of the composite particle is carried out by contacting dispersed TiO2 with the adsorbing emulsion polymer, typically with conventional low shear mixers. However, higher mixing intensity mixing may be employed in certain embodiments of this invention. A balance of reactivity between the TiO2 and latex is desired; if the reaction is too rapid then paint make-ability will suffer and undesired grit will be formed. Alternately, if the reaction is too weak either no adsorption will take place or it will be slow, resulting in drifting viscosity and tint strength.

The formation of the composite particles in the method of the first aspect of this invention is effected at or below the critical composite ratio. The critical composite ratio is believed to be the effective saturation level of absorbing polymer particles on the surface of the TiO2 particles. Below the critical composite ratio the surface of the TiO2 particles is effectively at the saturation level and there is excess absorbing latex in the continuous phase. Above the critical composite ratio portions of the TiO2 surface is exposed and the viscosity of the mixture may rise exponentially with time, believed due to bridge flocculation. Bridge flocculation is defined as bridging of two discrete TiO2 particles with one absorbing polymer particle. The "critical composite ratio" herein is that measured by the method provided in the Experimental methods section.

In the method of the first aspect of the present invention the stable aqueous composition is prepared at an equilibrated viscosity range of from 200 cps to 4000 cps, preferably from 200 cps to 2000 cps. By the "equilibrated viscosity" herein is meant the Brookfield viscosity measured at 30 minutes or more, preferably after 24 hours, more preferably after 2 days, and most preferably after 14 days, at 25° C., after admixing was complete. Aqueous composite compositions having an equilibrated viscosity below 200 cps can have compromised stability due to settling. Aqueous composite compositions having an equilibrated viscosity above 4000 cps may be difficult to pump depending on the handling requirements of the user. Aqueous composite compositions prepared above the critical composite ratio can be subject to substantial viscosity build with time and would not be suitable for use in aqueous coating compositions.

In the second aspect of the present invention there is provided a method for forming a stable aqueous composition comprising composite particles comprising: admixing TiO2 particles and adsorbing emulsion polymer particles at a mixing intensity of greater than 2 hp/kgal, preferably greater than 6 hp/kgal. The intensity of the agitation was measured and described by the power per unit volume of the mixing process, as known in the chemical engineering art and described, for example, in Fluid Mixing Technology by James Y. Oldshue, published by McGraw-Hill in 1983. The upper limit for mixing intensity (power per unit volume) is the highest that the chosen mixing method can reasonably provide without causing excessive gas dispersion or altering the particle size of the adsorbing polymer particles or TiO2 particles through attrition or agglomeration. The upper limit depends on the equipment used and is not likely to exceed $10^{10}$ hp/kgal.

In the method of the second aspect of the invention a "stable aqueous composition" as defined by grit levels, the composite particles, the TiO2 particles, and the adsorbing polymer particles are defined and constituted as disclosed hereinabove. In one embodiment composite particles can be formed with a rotor stator mixer. This can allow for continuous flow of composite into a standard grind or letdown tank.

One mode of operation is combining a stream of TiO2 slurry and adsorbing emulsion polymer in a tee fitting just upstream of the rotor stator. The discharge from the rotor stator would be a stable aqueous composition, i.e., low grit composite. A second mode of operation is preparing high grit composite in a tank under low mixing intensity. The discharge of the tank would then be passed through the rotor stator to break apart the grit particles.

Suitable mixing devices for the methods of the present invention include, for example, rotating devices, radial agitators, and axial agitators. Preferred is a shaft rotating on its own axis with one or more structures such as blades or impellers attached to the shaft and oriented perpendicular to the axis.

The methods of the present invention, may be performed on an industrial scale and are typically performed in tanks and often performed in cylindrical tanks with dished or flat bottoms or other geometries. In such vessels, mixing may be performed by any of a variety of means known in the art, including for example rotating impellers, homogenizers, rotor-stator devices, static mixers, jet mixed systems, and combinations thereof. If rotating impellers are chosen, suitable impellers include, for example, open impellers and close clearance impellers. If open impellers are chosen, suitable impellers include, for example, radial flow impellers, axial flow impellers, high shear impellers, high efficiency impellers and multiples and combinations thereof. Open impellers can be used with or without baffles or other internal devices that redirect flow. If close clearance impellers are chosen, suitable impellers include, for example, gate impellers, helical impellers, anchor impellers, and multiples and combinations thereof. In other cases, the methods of the present invention may be performed in pipelines. In pipelines that may be a part of a continuous process, for example, various suitable mixing means are known in the art and include for example inline mixers and motionless mixers. Preferred mixers for practicing the methods of the present invention are rotor-stator devices.

In one embodiment of the present invention, there are provided certain aqueous compositions including composite particles formed by the methods of the present invention that may find utility as aqueous coating compositions. The amount of inorganic particles in addition to composite particles included in the aqueous coating composition is from 0 to 95 volume %, based on the total dry volume of the aqueous composition and inorganic particles. Typically, the aqueous coating composition of this invention, when used to prepare dried coatings, has a solids level in the range of from 20 to 50 volume %, based on the volume of the aqueous composition. The pH of the aqueous composition is typically in the range of from 3 to 11, and preferably, in the range of from 7 to 10. A suitable viscosity range for the aqueous composition is from 50 to 130 Kreb units (KU), preferably from 70 to 120 KU, and more preferably from 90 to 110 KU.

Inorganic particles that may be used in addition to the composite particles include: metal oxides such as zinc oxide, cerium oxide, tin oxide, antimony oxide, zirconium oxide, chromium oxide, iron oxide, lead oxide, aluminum oxide, silicon oxide, titanium dioxide; zinc sulfide, lithopone, calcium carbonate, calcium sulfate, barium sulfate, mica, clay, calcined clay, feldspar, nepheline syenite, wollastonite, diatomaceous earth, alumina silicates, and talc. In one embodiment, the inorganic particles may have a particle size which is from 1 to 100 nm, alternately from 1 to 50 nm. Examples of desired inorganic particles with a particle size of less than 100 nm include zinc oxide, silicon oxide, titanium dioxide, and iron oxide.

The aqueous composition may optionally include organic pigment particles. Suitable organic pigments also include plastic pigments such as solid bead pigments and microsphere pigments containing voids or vesicles. Examples of solid bead pigments include polystyrene and polyvinyl chloride beads. Examples of microsphere pigments, which include polymer particles containing one or more voids include ROPAQUE™ opaque polymer and vesiculated polymer particles.

The aqueous coating compositions including optional inorganic particles are prepared by techniques which are well known in the coatings art. First, the inorganic particles are typically well dispersed in an aqueous medium under high shear such as is afforded by a COWLES™ mixer. In one embodiment the composite particles of the present invention are added under low shear stirring along with other coatings adjuvants as desired. Alternatively, the composite particles may be formed in situ during the formation of the aqueous coating composition. The aqueous composition may include, in addition to composite particles, additional multistage emulsion polymer not associated with the composite particles; also film-forming or non-film-forming solution or other emulsion polymers in an amount of 0% to 200% by weight of the adsorbing emulsion polymer of the present invention, and conventional coatings adjuvants such as, for example, emulsifiers, coalescing agents(coalescents), plasticizers, antifreezes, curing agents, buffers, neutralizers, thickeners, photosensitive moieties, rheology modifiers, humectants, wetting agents, biocides, plasticizers, antifoaming agents, UV absorbers, fluorescent brighteners, light or heat stabilizers, biocides, chelating agents, dispersants, colorants, waxes, water-repellants, and anti-oxidants.

The aqueous coating composition optionally contains a volatile organic compound ("VOC"). A VOC is defined herein as a carbon containing compound that has a boiling point below 280° C. at atmospheric pressure. Water and ammonia are excluded from VOCs. Frequently a VOC is deliberately added to a paint or coating to improve the film properties of a coating or to aid in the application properties of the composition employed to prepare the coating. Examples are glycol ethers, organic esters, aromatic compounds, ethylene and propylene glycol, and aliphatic hydrocarbons.

In one embodiment, the aqueous composition contains up to 20% VOC, preferably less than 5%, more preferably less than 3%, and even more preferably less than 1.7%, by weight based on the total weight of the aqueous coating composition. Additional methods such as steam stripping and choice of low VOC containing additives like biocides, defoamers, soaps, dispersants, and thickeners are suitable for further reducing the aqueous coating composition to less than 0.05% VOC by weight based on the total weight of the aqueous coating composition.

Additionally, the low VOC aqueous coating composition optionally contains coalescing agents that are not VOCs. A coalescing agent is a compound that is added to a water-borne emulsion polymer, paint, or coating, which reduces the minimum film forming temperature (MFFT) of the emulsion polymer, paint or coating by at least 1° C. The MFFT is measured using ASTM test method D2354. A non-VOC coalescing agent is a coalescing agent which has a boiling point above 280° C. at atmospheric pressure. Examples of coalescing agents that are not VOCs include plasticizers, low molecular weight polymers, surfactants, and autooxidizable plasticizers such as alkyl esters of unsaturated fatty acids. Preferred are alkyl esters prepared from oils such as linseed, tung, dehydrated castor, soybean, tall, sunflower, and corn. Examples of non-VOC coalescing agents include esters of unsaturated fatty acids, such as mono-, di-, or tri-unsaturated fatty acids. Suitable unsaturated fatty acid esters include monounsaturated fatty acid esters formed from palmitoleic acid, oleic acid, or caproleic acid; diunsaturated fatty acid esters formed from linoleic acid; triunsaturated fatty acid esters formed from linolenic acid or eleosteric acid, or mixtures thereof.

Conventional coatings application methods such as, for example, brushing, rolling, and spraying methods such as, for example, air-atomized spray, air-assisted spray, airless spray, high volume low pressure spray, and air-assisted airless spray may be used to apply the aqueous composition of this invention. Additionally, for some systems, other application techniques may be used to apply the aqueous polymer composition, such as, caulk gun, roll coaters, and curtain coaters. The aqueous polymer composition may be advantageously applied to substrates such as, for example, plastic, wood, metal, primed surfaces, previously painted surfaces, weathered painted surfaces, glass, composites, and cementitious substrates. Drying to form the coating is typically allowed to proceed under ambient conditions such as, for example, at 0° C. to 35° C. but may be accelerated with heat or low humidity.

Abbreviations Used
Butyl acrylate BA
Methyl methacrylate MMA
Methacrylic acid MAA
Ureido methacrylate (50% active) UMA
Phosphoethyl methacrylate (65% active) PEM
Sodium 4-vinylbenzenesulfonate SSS
Sodium persulfate NaPS
Deionized water DI water Experimental Methods Brookfield viscosities herein were measured using spindle #4 at 60 RPM unless stated otherwise.

The critical composite ratio herein is expressed as a pigment volume concentration ("PVC") and was determined as follows: An aqueous TiO2 slurry was added to an adsorbing emulsion polymer at a PVC of 10-20 while mixing at ca. 450 rpm. Optionally, a pigment dispersant was added. The viscosity of the mixture was measured on a Brookfield viscometer after ca. 3 minutes of mixing time. The PVC was then incrementally increased in units of 4 by the addition of additional TiO2 slurry. The mixing rate was maintained at ca. 450 rpm. The time between TiO2 addition and viscosity measurement was ca. 3 minutes. The time between TiO2 addition steps was ca. 4 minutes. The critical composite ratio was determined from a plot of Brookfield viscosity and TiO2 PVC and was taken as the intercept between the tangent line at higher PVC and the steady state value at lower PVCs.

Grit determination for composite samples. In this method 200 g of composite was passed through an apparatus which holds a number of pre-weighed screens from 20 to 325 mesh in succession. Warm water was rinsed through the apparatus to clean the screens, and then the apparatus was taken apart and the screens were dried in an oven. The final (dried weight) of the screens minus the initial weight multiplied by a factor of 5000 yielded a grit value in units of parts per million.

The following Examples serve to illustrate the invention.

EXAMPLE 1

Composite Particles Prepared Below the Critical Composite Ratio

Preparation of Adsorbing Emulsion Polymer a

A stage 1 monomer emulsion was prepared by mixing 150 g DI water, 12.6 g (30% active) anionic surfactant A, 292.3 g BA, 205.1 g MMA, 2.52 g ALMA, and 4.03 g MAA. A stage 2 monomer emulsion was prepared by mixing 275 g DI water, 17.4 g (30% active) anionic surfactant A, 403.7 g BA, 220.9 g MMA, 5.6 g MAA, 59.9 g PEM, and 12.0 g UMA.

A 5-liter reactor, four-necked round bottom flask equipped with a paddle stirrer, a thermocouple, nitrogen inlet, and reflux condenser was assembled. To the flask was added 1000 g DI water and 50.0 g (30% active) anionic surfactant A, and stirring was started. The contents of the flask were heated to 84° C. under a nitrogen atmosphere. A solution of 2.4 g NaPS in 35 g DI water was added. The stage 1 monomer emulsion was fed into the reactor over 40 minutes at 16.7 g/min. A solution of 1.8 g NaPS in 108 g DI water was fed separately to the flask for 40 minutes at 1.1 g/min. After the addition of stage 1 monomer emulsion the container was rinsed with a small portion of DI water and added into the flask. The NaPS co-feed was stopped and the reaction held at 83-86° C. for 30 minutes.

The stage 2 monomer emulsion was fed into the flask over 60 minutes at 16.7 g/min. The NaPS co-feed was re-started and fed for 60 minutes at 1.1 g/min. After the addition of stage 2 monomer emulsion container was rinsed with a small portion of DI water and fed into the flask. The contents of the flask were maintained at 84-86° C. for 5 minutes. The batch was then cooled to 65° C. As the batch was cooling, at 80° C., a solution of 16.5 g (28% conc.) aqueous ammonia in 18.5 g DI water was added and rinsed with 5 g DI water. A redox pair was added. The batch was cooled to room temperature. While cooling and <50° C., 21.8 g (28% conc.) aqueous ammonia was added. The particle size was 64 nm, solids of 39.1%, and a pH of 8.1 The critical composite ratio for adsorbing polymer a/TIPURE™ 746 (TiO2) was determined to be 47 PVC.

Preparation of Composite

A 40 PVC, 35 volume solids composite particle composition was prepared by the following method: 33.89 g adsorbing emulsion polymer a, 0.86 g water, 0.5 g TAMOL™ 2002 (25% with KOH) and 0.05 g FOAMSTAR™ A-34 were combined. 41.55 g TIPURE™ 746 was added to the emulsion polymer mixture while stirred at 930 rpm using a bench mixer. The Brookfield viscosity was 2020 cps after an aging period of 2 days.

COMPARATIVE EXAMPLE A

Composite Particles Prepared Above the Critical Composite Ratio

A 50 PVC, 35 volume solids latex composite was prepared by the following method. 28.24 g adsorbing emulsion polymer a, 0.71 g water, 0.41 g TAMOL™ 2002 (25% with KOH) and 0.04 g FOAMSTART™ A-34 were combined. 51.94 g TIPURE™746 was added to the latex mixture while stirred at 950 rpm using a standard bench mixer. The Brookfield viscosity (BF) was 8200 cps after an aging period of 2 days.

TABLE 1.1

Impact of formulating the composite below and above the critical composite ratio for adsorbing polymer a/TIPURE ™ 746 (TiO2)

| PVC | Volume Solids | BF init 3/60 | 3 Hr BF 3/60 | 6 Hr BF 3/60 | 23 Hr BF 3/60 |
|---|---|---|---|---|---|
| 10 | 0.35 | 6 | 6 | 6 | 30 |
| 20 | 0.35 | 10 | 10 | 8 | 30 |

TABLE 1.1-continued

Impact of formulating the composite below and above the critical composite ratio for adsorbing polymer a/TIPURE ™ 746 (TiO2)

| PVC | Volume Solids | BF init 3/60 | 3 Hr BF 3/60 | 6 Hr BF 3/60 | 23 Hr BF 3/60 |
|---|---|---|---|---|---|
| 30 | 0.35 | 16 | 20 | 22 | 120 |
| 40 | 0.35 | 50 | 178 | 242 | 2020 |
| 50 | 0.35 | 358 | 810 | 4910 | 8200 |

EXAMPLE 2

Preparation of Stable Aqueous Composite Composition

Preparation of Adsorbing Emulsion Polymer b

A primary monomer emulsion was prepared by mixing 555 g DI water, 68.7 g (30% active) anionic surfactant A, 939.6 g BA, 748.2 g MMA, and 3.48 g MAA. A stage 1 monomer emulsion was prepared by transferring 772 g of the primary monomer emulsion into a separate vessel, then adding 40.0 g PEM diluted with 30 g DI water. A stage 2 monomer emulsion was prepared by transferring 719 g of the primary monomer emulsion into a separate vessel. A stage 3 monomer emulsion was prepared by adding 17.4 g UMA to the remaining primary monomer emulsion. A 5-liter reactor, four-necked round bottom flask equipped with a paddle stirrer, a thermocouple, nitrogen inlet, and reflux condenser was assembled. To the flask was added 900 g DI water, 3.9 g (30% active) anionic surfactant. The contents of the flask were heated to 84° C. under a nitrogen atmosphere. The flask was charged with 110.2 g of stage 1 monomer emulsion and stirred for 1 minute. A solution of 3.48 g NaPS in 35 g DI water was added, and rinsed with 10 g DI water. After 3 minutes, stage 1 monomer emulsion was fed into the reactor over 30 min, followed by a rinse of 25 g DI water. A separate solution of 1.74 g NaPS in 98 g DI water was fed separately to the flask for 100 minutes, followed by a rinse of a 5 g DI water. The contents of the flask were maintained at 84-86° C. throughout the feeds. Stage 2 monomer emulsion was then fed over 30 minutes. Stage 3 monomer emulsion was added to the flask over 30 minutes. The batch was then cooled to 65° C. During the cooling, at about 80° C., the batch was partially neutralized with a solution of 12 g (28% conc.) aqueous ammonia in 12 g DI water, then rinsed with 5 g DI water. A redox pair was then added. The batch was cooled to room temperature. While cooling and <50° C., the reaction was neutralized to pH 8.3 with a dilute KOH solution over 20 minutes. After addition of this feed, the container was rinsed with 4 g DI water rinse and added to batch. The particle size was 114 nm, solids were 45.5% TS, and pH of 8.3. The critical composite ratio for adsorbing polymer b/TIPURE™ 746 (TiO2) was determined to be 36 PVC.

Formation of Composite Particles.

A composite was formed by mixing 129.76 g emulsion polymer b, 32.67 g water, 1.92 g TAMOL™ 2002 (25% with KOH) and 0.58 grams FOAMSTAR™ A-34.125 g TIPURE™ R-746 (E.I. DuPont de Nemours and Co.) at 19.5% solids was added to this mixture while stirred using a bench mixer. A sample of the composite was analyzed with an optical microscope. No large grit particles were observed in this sample. The composite mixture was then letdown with an extender grind containing 13.95 g water, 0.54 g TAMOL™165A (Dow Chemical Co.), 1 gram of BYK 348, 0.5 g FOAMSTAR™ A-34 (Cognis GMBH) and 22.5 g MINEX™ 10 (Unimin Corp.). Finally the latex/grind mixture was letdown with the following additives under bench mixing. 108.15 g RHOPLEX™ VSR-1050LOE (50% solids) (Dow Chemical Co.), 17.50 g ROPAQUE™ Ultra E (Dow Chemical Co.), 3.55 g OPTIFILM™ Enhancer 400 (Eastman Chemical CO.), 0.5 g FOAMSTAR™ A-34, 14.33 g ACRYSOL™ RM-2020 NPR (Dow Chemical Co.), 2.60 g ACRYSOL™ SCT-275 (Dow Chemical Co.) and 41.37 g water.

The coating properties are shown in Table 2.

COMPARATIVE EXAMPLE B

Attempted Composite Formation with Ineffective Polymer c

Preparation of Ineffective Emulsion Polymer c

A first monomer emulsion was prepared by mixing 200 g of DI water, 28.25 g (30% active) anionic surfactant, 285.6 g BA, 197.22 g MMA, 20.40 g PEM, and 7.53 g (90% active) SSS. A second monomer emulsion was prepared by mixing 420 g DI water, 28.75 g (30% active) anionic surfactant B, 651.1 g BA, 515.15 g MMA, and 16.9 g UMA. The reactor was a 5-liter, four necked round bottom flask equipped with a paddle stirrer, a thermometer, nitrogen inlet, and a reflux condenser. To the flask was added 900 g DI water and 11.3 g (30% active) anionic surfactant B. The contents of the flask were heated to 84° C. under a nitrogen atmosphere and stirring initiated. A portion of the first monomer emulsion (110 g) was then added, quickly followed by a solution of 3.35 g NaPS dissolved in 20 g DI water, and a rinse of 5 g DI water. After stirring for 10 minutes, the remainder of the first monomer emulsion with a 25 g DI water rinse and 0.40 g NaPS dissolved in 30 g DI water were added linearly and separately over 30 minutes. The contents of the flask were held at 84° C. for 20 minutes. A solution of 9 g (29% active) ammonium hydroxide and 9 g DI water was then added to the flask over a period of 10 minutes. The second monomer emulsion with a 25 g DI water rinse and 1.1 g NaPS dissolved in 80 g DI water were added separately to the flask over a period of 80 minutes. The contents of the flask were maintained at a temperature of 83-84° C. during the addition of the second monomer emulsion. The contents of the flask were then cooled to 65° C. and a catalyst/activator pair was added to the flask. 37 g (42% solids) of TAMOL™ 2002 was added. The polymer was then neutralized to pH 8.56 with dilute potassium hydroxide. The particle size was 97 nm and the solids 45.66%. There was no measurable critical composite ratio for comparative adsorbing emulsion polymer c and TIPURE™ R-746 (TiO2). This is believed to be due to lack of composite formation, due at least in part to insufficient adsorbing monomer in the adsorbing emulsion polymer (for the TiO2 composition used)

A 29.19 PVC, 34 volume solids coating was prepared by the following method. A composite was first formed by mixing 124.77 g adsorbing emulsion polymer c, 37.90 g water and 0.58 g FOAMSTAR™ A-34.125 g TIPURE™ R-746 at 19.5% solids was added to this mixture while stirred using a bench mixer. A sample of the composite was analyzed with an optical microscope. Large grit particles were observed on the order of 50-500 microns. It is known that particles of this size are prone to settling with time which compromises storage stability.

The composite mixture was then letdown with an extender grind containing 13.95 g water, 0.54 g TAMOL™ 165A, 1 g BKY 348, 0.5 g FOAMSTAR™ A-34 and 22.50 g MINEX™ 10. Finally the latex/grind mixture was letdown with the following additives under standard bench mixing. 108.15 g RHOPLEX™ VSR-1050LOE (50% solids), 17.50 g ROPAQUE™ Ultra E, 3.5 g OPTIFILM™ Enhancer 400, 0.5 g FOAMSTAR™ A-34, 14.33 g ACRYSOL™ RM-2020 NPR, 2.60 g ACRYSOL™ SCT-275 and 41.37 grams of water. The coatings properties are shown in Table 2.1

TABLE 2.1

Performance of coatings containing composite

| Coating | Example 2 | Comparative Example B |
|---|---|---|
| Wt % copolymerized PEM in emulsion pol. | 2.3 | 1.2 |
| TiO2 | TIPURE ™ R-746 | TIPURE ™ R-746 |
| Equilibrated Brookfield viscosity (#4 spindle, 60 rpm) | 2880 | 80 |
| Observation | trace grit | settling |
| 60 gloss/dry coating | 41 | 28 |
| S/mil dry coating | 6.73 | 6.06 |

The storage stable aqueous composition of the invention, Example 2, provided higher gloss and superior hiding performance of the coating compared to Comparative Example B.

EXAMPLE 3

Composite Prepared at a PVC and Volume Solids to Give Acceptable Viscosity

Preparation of Adsorbing Emulsion Polymer d

A stage 1 monomer emulsion was prepared by mixing 136.2 g DI water, 20.2 g (30% active) anionic surfactant A, 235.4 g BA, 187.4 g MMA, 0.9 g MAA, and 36.8 g PEM. A stage 2 monomer emulsion was prepared by mixing 154.5 g DI water, 22.9 g (30% active) anionic surfactant A, 267.0 g BA, 212.6 g MMA, and 1.0 g MAA. A stage 3 monomer emulsion was prepared by mixing 209.3 g DI water, 31.0 g (30% active) anionic surfactant A, 361.6 g BA, 287.9 g MMA, 16.0 g of 50% aqueous solution of UMA, and 1.3 g MAA. A 5-liter reactor, four-necked round bottom flask equipped with a paddle stirrer, a thermocouple, nitrogen inlet, and reflux condenser was assembled. To the flask was added 1150 g DI water and 6.0 g (30% active) of anionic surfactant A and stirring was initiated. The contents of the flask were heated to 84° C. under a nitrogen atmosphere. A 110.0 g portion of the stage 1 monomer emulsion was added to the kettle followed by a 25 g DI water rinse. The contents were stirred for 1 minute then a solution of 3.2 g NaPS in 40 g DI water was added. After another 2 minutes monomer emulsion 1 was added to the flask over 29 minutes. Concurrently, a solution of 1.6 g NaPS in 98 g DI water was fed separately to the flask at a rate of 1.0 g/min. After completion of monomer emulsion 1 addition, monomer emulsion 2 was added over 28 minutes. After completion of monomer emulsion 2 feed, monomer emulsion 3 was added over 45 minutes. The contents of the flask were maintained at 84-86° C. during the additions. The monomer emulsion was rinsed with 20 g DI water after each stage of completion. The batch was then cooled to 65° C. and 12 g aqueous ammonia (28% active) in 12 g DI water was added. A redox pair was then added. The batch was cooled to room temperature. While cooling and at <50° C., 160 g dilute aqueous solution of potassium hydroxide was added. The particle size was 85 nm and solids were 42.0% with a pH adjusted to 8.2. The critical composite ratio of adsorbing polymer d/TIPURE™ 746 (TiO2) was determined to be 38 PVC.

A 36 PVC, 34.3 volume solids composite was prepared by the following method. 30.06 g adsorbing polymer d, 2.81 g water, 0.45 g TAMOL™ 2002 (25% with KOH) and 0.14 g FOAMSTAR™ A-34 were combined. A mixture of 35.80 g TIPURE™ 746 and 2.86 g water was added to the mixture with bench mixing. The Brookfield viscosity was 2940 cps after an aging period of 14 days.

COMPARATIVE EXAMPLE C

Composite Prepared at a PVC and Volume Solids that Gives Unacceptably High Viscosity A 38 PVC, 36.3 volume solids composite was prepared by the following method. 29.32 g adsorbing polymer d, 2.74 g water, 0.44 g TAMOL™ 2002 (25% with KOH) and 0.13 g FOAMSTAR™ A-34 were combined. A mixture of 32.05 g TIPURE™ 746 and 5.26 g water was added to the latex mixture with bench mixing. The Brookfield viscosity was 6200 cps after an aging period of 14 days.

TABLE 3.1

Viscosities of 14 day aged composites prepared at varying PVC and volume solids.

| | Volume Solids | | |
|---|---|---|---|
| PVC | 36.3 | 35.3 | 34.3 |
| 38 | 6200 | | 4300 |
| 37 | | 3985 | |
| 36 | 4380 | | 2940 |

The viscosity of composite systems can be optimized by titration of the Pigment Volume Concentration (PVC) to a level below the critical composite ratio that has the desired end-use viscosity range for storage and handling.

EXAMPLE 4

Composite Prepared with 75 Nm Adsorbing Emulsion Polymer

Preparation of Adsorbing Emulsion Polymer e

A stage 1 monomer emulsion was prepared by mixing 136 g DI water, 19.0 g (30% active) anionic surfactant A, 389.8 g BA, 273.5 g MMA, 5.38 g MAA, and 3.36 g ALMA. A stage 2 monomer emulsion was prepared by mixing 312 g DI water, 29.0 g (30% active) anionic surfactant A, 501.1 g BA, 381.8 g MMA, 16.0 g UMA, 7.42 g MAA, and 29.7 g PEM. A 5-liter reactor, four-necked round bottom flask equipped with a paddle stirrer, a thermocouple, nitrogen inlet, and reflux condenser was assembled. To the flask was added 1244 g DI water and 40 g (30% active) of an anionic surfactant A and stirring was initiated. The contents of the flask were heated to 88° C. under a nitrogen atmosphere. A 137 g portion of the stage 1 monomer emulsion was added to the kettle followed by a 25 g DI water rinse. The contents were stirred for 1 minute then a solution of 3.26 g NaPS in 40 g DI water was added. After another 2 minutes monomer emulsion 1 was added to the flask over 40 minutes. Concurrently, a solution of 1.45 g NaPS in118 g DI water was fed separately to the flask at a rate of 1.07 g/min. After completion of monomer emulsion 1 feed the initiator cofeed was stopped and batch was held at temperature for 30 minutes. The initiator cofeed was then restarted and monomer emulsion 2 was added over 70 minutes. The contents of the flask were maintained at 84-86° C. during the additions. The monomer emulsion flask was rinsed with 140 g DI water. The batch was then cooled to 65° C. and a solution of 11 g aqueous ammonia (28% conc.) in 22 g DI water was added. A redox pair was then added. The batch was cooled to room temperature. While cooling and at <50° C., a dilute aqueous solution of potassium hydroxide was added to pH of 7.8. The particle size was 75 nm and solids of 40.8% with a pH of 7.8.

A 41.7 PVC, 40.1 volume solids composite was prepared by the following method. 49.02 g adsorbing polymer e, 0.6 g water, 0.83 g TAMOL™ 2002 (18.1% with KOH) and 0.1 g FOAMSTAR™ A-34 were combined. 70.96 g KRONOS™ 4311 was added to the latex mixture while stirred at 466 rpm using a standard bench mixer. The critical composite ratio of adsorbing emulsion polymer e (75 nm polymer particles)/KRONOS™ 4311 (TiO2) was 55 PVC. The Brookfield viscosity was 180 cps after an aging period of 30 minutes.

COMPARATIVE EXAMPLE D

Composite Prepared with 100 Nm Adsorbing Emulsion Polymer

Preparation of Adsorbing Emulsion Polymer f

A stage 1 monomer emulsion was prepared by mixing 148 g DI water, 27.5 g (30% active) anionic surfactant A, 423.4 g BA, 297.1 g MMA, 5.84 g MAA, 3.65 g ALMA. A stage 2 monomer emulsion was prepared by mixing 339.4 g DI water, 38.5 g (30% active) anionic surfactant A, 604.9 g BA, 354.1 g MMA, 17.3 g UMA, 8.1 g MAA, and 32.3 g of PEM. A 5-liter reactor, four-necked round bottom flask equipped with a paddle stirrer, a thermocouple, nitrogen inlet, and reflux condenser was assembled. To the flask was added 929.0 g DI water and 3.50 g (30% active) of an anionic surfactant A and stirring was initiated. The contents of the flask were heated to 88° C. under a nitrogen atmosphere. A 110.1 g portion of the stage 1 monomer emulsion was added to the kettle followed by a 25 g DI water rinse. The contents were stirred for 1 minute then a solution of 3.55 g NaPS in 44 g DI water was added. After another 2 minutes monomer emulsion 1 was added to the flask over 40 minutes. Concurrently, a solution of 1.58 g NaPS in 118 g DI water was fed separately to the flask at a rate of 1.07 g/min. After completion of monomer emulsion 1 feed the initiator cofeed was stopped and the batch was held at temperature for 30 minutes. The initiator cofeed was then restarted and monomer emulsion 2 was added over 70 minutes. The contents of the flask were maintained at 84-86° C. during the additions. The monomer emulsion was rinsed with 50 g DI water. The batch was then cooled to 65° C. and 11 g of aqueous ammonia (28% conc.) in 22 g DI water was added. A redox pair was then added. The batch was cooled to room temperature. While cooling and at <50° C., a dilute aqueous solution of potassium hydroxide was added to a pH of 7.8. The particle size was 100 nm and solids of 46.9% with a pH of 7.8

A 40.8 PVC, 40.2% volume composite was prepared by the following method. 42.74 g adsorbing emulsion polymer e, 6.77 g water, 0.83 g TAMOL™ 2002 (18% with KOH) and 0.10 grams of FOAMSTAR™ A-34 were combined. 69.38 g KRONOS™ 4311 (Kronos, Inc.) was added to the mixture while stirred at 460 rpm using a bench mixer. The critical composite ratio of adsorbing emulsion polymer f (100 nm polymer particles)/KRONOS™ 4311 (TiO2) was 35 PVC. The Brookfield viscosity was 6720 cps after an aging period of 30 minutes.

The critical composite ratio can be adjusted by using different size adsorbing emulsion polymer particles. The critical composite ratio is higher for smaller latex particles. Two composite mixtures were prepared at 41 PVC and 40 VS (Example 4 and Comparative Example D). The 41 PVC composite formed in Example 4 was below the critical composite ratio and had a Brookfield viscosity of 180 cps. The 41 PVC composite formed in Example 4 Comparative was above the critical composite ratio and had a Brookfield viscosity of 6720 cps.

COMPARATIVE EXAMPLE E

Composite Particles Prepared Using a Stirred Tank, Pitched Blade Turbine, Low Mixing Intensity Preparation of Adsorbing Emulsion Polymer g A stage 1 monomer emulsion was prepared by mixing 148 g DI water, 27.5 g (30% active) anionic surfactant A, 419.8 g BA, 303 g MMA, 3.65 g ALMA, and 3.65 g MAA. A stage 2 monomer emulsion was prepared by mixing 339.4 g DI water, 37.7 g (30% active) anionic surfactant A, 524.2 g BA, 432.9 g MMA, 17.3 g UMA, 10.1 g MAA, and 32.3 g PEM. A 5-liter reactor, four-necked round bottom flask equipped with a paddle stirrer, a thermocouple, nitrogen inlet, and reflux condenser was assembled. To the flask was added 985 g DI water, 4.35 g (30% active) anionic surfactant A with a 26 g DI water rinse. The contents of the flask were heated to 84° C. under a nitrogen atmosphere. The flask was charged with 110.1 g of stage 1 monomer emulsion, rinsed with 25 g DI water, and stirred for 1 minute. A solution of 3.55 g NaPS in 35 g DI water was added, and rinsed with 10 g DI water. After 3 minutes, stage 1 monomer emulsion was fed into the reactor over 40 min, followed by a rinse of 35 g DI water. A separate solution of 1.58 g NaPS in 109 g DI water was fed separately to the flask at 1.0 g/min for 40 minutes. The contents of the flask were maintained at 84-86° C. throughout the feeds. After completion of stage 1 monomer emulsion the separate persulfate co-feed was stopped and the batch was held at 83-85° C. for 30 minutes. The monomer emulsion vessel was rinsed with 35 g DI into the flask. The stage 2 monomer emulsion was added to the flask and the remaining separate persulfate co-feed was re-started (at 1 g/min), and both feeds were added over 70 minutes. The batch was then cooled to 65° C. During the cooling, at about 80° C., a solution of 11.2 g (28% conc.) aqueous ammonia in 11.2 g DI water was added, then rinsed with 9 g DI water. A redox pair was then added. The batch was cooled to room temperature. While cooling and <50° C., 35.6 g TAMOL 2002™ dispersant was added and rinsed with 15 g DI water. The batch was neutralized to pH 8.0 with aqueous ammonia (28% conc.) and rinsed with 4 g DI water. The particle size was 105 nm, solids were 45.5%, and pH of 8.0.

Preparation of Composite 1,543.1 g adsorbing polymer g was charged to a 1 gallon stainless steel cylindrical tank with a flat bottom. The tank diameter was 6.6 in and the height was 7.8 in. An agitator shaft with a 3.5 in diameter, four bladed, 45° pitched blade turbine was placed in the tank. The off bottom clearance of the impeller was 1.75 in. 161.8 g DI water was added to the vessel and the agitator speed was set to 260 rpm. 3.0 g FOAM-STAR™ A-34 were charged to the vessel followed by a 3.2 g DI water rinse. 1,617.6 g KRONOS™ 4311 (TiO2) was pumped top surface to the vessel over 1 minute, followed by a 147.7 g rinse. The vessel contents were then mixed at 260 rpm for an additional 5 minutes. This speed imparts a power per volume of 0.32 kW/m$^3$ (1.63 hp/kgal). A sample of the composite material was filtered through a 45 micron screen. The concentration of grit particles greater than 45 micron was 2,290 ppm on a dry mass basis.

EXAMPLE 5

Preparation of Composite, Stirred Tank, Pitched Blade Turbine, High Power 1,543.1 g adsorbing polymer g was charged to a 1 gallon stainless steel cylindrical tank with a flat bottom. The tank diameter was 6.6 in and the height was 7.8 in. An agitator shaft with a 3.5 in diameter, four bladed, 45° pitched blade turbine was placed in the tank. The off bottom clearance of the impeller was 1.75 in. 161.8 g DI water was added to the vessel and the agitator speed was set to 620 rpm. 3.0 g FOAM-STAR™ A-34 were charged to the vessel followed by a 3.2 g DI water rinse. 1,617.6 g KRONOS™ 4311 was pumped top surface to the vessel over 1 minute, followed by a 147.7 g rinse. The vessel contents were then mixed at 620 rpm for an additional 5 minutes. This speed imparts a power per volume of 3.5 kW/m$^3$ (17.8 hp/kgal). A sample of the composite material was filtered through a 45 micron screen. The concentration of grit particles greater than 45 micron was 245 ppm on a dry mass basis.

EXAMPLE 6

Preparation of Composite

Use of Stirred Tank, Pitched Blade Turbine, Recycle Through Rotor Stator to Break Up Grit The material from Comparative Example E was recirculated through a rotor stator to break up the particles greater than 45 micron. Composite was pumped from the 1 gallon tank with a Masterflex tubing pump at a rate of 210 g/minute through a Silverson L4-R inline rotor stator and back into the 1 gallon tank. The rotor speed was set to 3,200 rpm, which imparts a power per volume of 152.5 kW/m$^3$ (773.9 hp/kgal). After 30 minutes of recycle flow, a sample was taken and the grit concentration was 150 ppm. After 90 minutes of recycle flow, a sample was taken and the grit concentration was 35 ppm. The recycled material was formulated into a coating and had good hiding and gloss.

EXAMPLE 7

Preparation of Composite with Rotor Stator Mixing

Example 7a

Continuous Process, Feed Pre-Composite Polymer and Tio$_2$ to a Rotor Stator 7631.3 g adsorbing emulsion polymer g was premixed with 1,530.4 DI water and 14.7 g FOAMSTAR™ A-34 followed by a 16 g DI water rinse. This premix was charged to a tank and blended for 5 minutes. KRONOS™ 4311 (TiO2) was charged to a separate tank and agitated mildly to avoid settling. The premix was pumped to the rotor stator chamber at 104.6 g per minute. The KRONOS™4311 was pumped to the rotor stator chamber at 93.2 g per minute. The rotor stator speed was set at 3,200 rpm, which imparted a power per volume of 152.5 kW/m$^3$ (773.9 hp/kgal). The PVC of the resulting mixture was 33.7%. The solids, total grit level in ppm, and equilibrated viscosity of the composite are listed in Table 7.1.

Example 7b

The rotor stator speed was set at 2,540 rpm, which imparts a power per volume of 76.2 kW/m3 (387.0 hp/kgal). The PVC of the resulting mixture was 33.7%. The solids, total grit level in ppm, and equilibrated viscosity of the composite are listed in Table 7.1.

Example 7c

The flow rates were changed to lower the ratio of adsorbing polymer g to TiO2. The premix was pumped to the rotor stator chamber at 94.2 g per minute. KRONOS™4311 was pumped to the rotor stator chamber at 93.2 g per minute. The rotor stator was set at 3,200 rpm, which imparted a power per volume of 152.5 kW/m$^3$ (773.9 hp/kgal). The PVC of the resulting mixture was 36.1%. The solids, total grit level in ppm, and equilibrated viscosity of the composite are listed in Table 7.1.

Example 7D

The rotor stator speed was set at 2,540 rpm, which imparted a power per volume of 76.2 kW/m3 (387.0 hp/kgal). The PVC of the resulting mixture was 36.1%. The solids, total grit level in ppm, and equilibrated viscosity of the composite are listed in Table 7.1.

Example 7E

The premix was pumped to the rotor stator chamber at 104.6 g per minute. KRONOS™4311 was pumped to the rotor stator chamber at 116.4 g per minute. The rotor stator was set at 3,200 rpm, which imparted a power per volume of 152.5 kW/m$^3$ (773.9 hp/kgal). The PVC of the resulting mixture was 38.9%. The solids, total grit level in ppm, and equilibrated viscosity of the composite are listed in Table 7.1.

Example 7F

The rotor stator speed was set at 2,540 rpm, which imparted a power per volume of 76.2 kW/m3 (387.0 hp/kgal). The PVC of the resulting mixture was 38.9%. The solids, total grit level in ppm, and equilibrated viscosity of the composite are listed in Table 7.1.

TABLE 7.1

| | Composite parameters | | | | |
|---|---|---|---|---|---|
| Run # | Composite PVC | Rotor Stator (rpm) | Total Grit (ppm) | Solids | 24 hr. Brookfield Viscosity (spindle #4, 60 rpm) |
| Example 7a | 33.7 | 3200 | 39 | 56.35% | 480 |
| Example 7b | 33.7 | 2540 | 35 | 56.48% | 330 |
| Example 7c | 36.1 | 3200 | 45 | 57.33% | 1130 |
| Example 7d | 36.1 | 2540 | 33 | 57.33% | 1040 |
| Example 7e | 38.9 | 3200 | 51 | 58.45% | 6750 |
| Example 7f | 38.9 | 2540 | 43 | 58.60% | 4200 |

Composite particles formed by the method of the present invention provide stable aqueous compositions as evidenced by low grit formation.

Table 7.2 shows the impact of the conditions of composite formation on the final coating opacity and gloss. S/Mil was evaluated following AS™ Test Method D-2805.70.

TABLE 7.2

Coating compositions and properties

|  | Coating Example 7a | Coating Example 7b | Coating Example 7c | Coating Example 7d | Coating Example 7e | Coating Example 7f |
|---|---|---|---|---|---|---|
| Ingredients (in lbs) Composite Pre-mix |  |  |  |  |  |  |
| Adsorbing polymer g | 318.04 | 318.04 | 286.99 | 286.99 | 254.66 | 254.66 |
| FOAMSTAR A-34 | 0.62 | 0.62 | 0.56 | 0.56 | 0.50 | 0.50 |
| Water | 63.91 | 63.91 | 58.04 | 58.04 | 51.02 | 51.02 |
| KRONOS ™ 4311 | 342.00 | 342.00 | 342.01 | 342.01 | 342.03 | 342.03 |
| Composite Pre-mix Sub-Total | 724.57 | 724.57 | 687.60 | 687.60 | 648.21 | 648.21 |
| Letdown |  |  |  |  |  |  |
| RHOPLEX ™ VSR-1050 | 202.63 | 202.63 | 230.81 | 230.81 | 260.14 | 260.14 |
| Propylene Glycol | 9.30 | 9.30 | 9.30 | 9.30 | 9.30 | 9.30 |
| TEXANOL ™ | 4.66 | 4.66 | 4.66 | 4.66 | 4.66 | 4.66 |
| FOAMSTAR ™ A-34 | 1.04 | 1.04 | 1.04 | 1.04 | 1.04 | 1.04 |
| ACRYSOL ™ RM-2020 NPR | 26.00 | 26.00 | 26.00 | 26.00 | 26.00 | 26.00 |
| Water | 87.71 | 87.71 | 96.32 | 96.32 | 106.19 | 106.19 |
| ACRYSOL ™ RM-8W | 2.80 | 2.80 | 2.80 | 2.80 | 2.80 | 2.80 |
| Grind Sub-Total | 334.14 | 334.14 | 370.93 | 370.93 | 410.14 | 410.14 |
| Total | 1058.71 | 1058.71 | 1058.53 | 1058.53 | 1058.34 | 1058.34 |
| Properties |  |  |  |  |  |  |
| KU Viscosity initial | 112 | 115 | 113 | 113 | 115 | 104 |
| KU Viscosity equilibrated | 113 | 116 | 118 | 114 | 117 | 109 |
| 20° Gloss | 38 | 36 | 36 | 37 | 36 | 33 |
| 60° Gloss | 71 | 71 | 70 | 71 | 71 | 69 |
| S/Mil | 7.43 | 7.39 | 7.34 | 7.47 | 7.49 | 7.51 |

Coatings formed by a continuous process system, Examples 7a-7f, demonstrate desirable hiding and gloss supporting the conclusion that composite can be prepared using a continuous process system.

What is claimed is:

1. A method for forming a stable aqueous composition comprising composite particles comprising: admixing TiO2 particles and adsorbing emulsion polymer particles at or below the critical composite ratio at a mixing intensity of greater than 2 hp/kgal to an equilibrated viscosity range of from 200 cps to 4000 cps.

2. The method of claim 1 wherein said admixing occurs in a mixing zone comprising at least one static stator element and at least one rotating rotor element.

3. The method of claim 1 wherein said adsorbing emulsion polymer particles are multistage emulsion polymer particles comprising, as copolymerized units:
   from 0.5% to 5%, by weight P-acid monomer, based on the weight of said emulsion polymer;
   from 0% to 0.05% by weight multiethylenically unsaturated monomer, based on the weight of said emulsion polymer; and
   at least one second monoethylenically unsaturated monomer;
   said emulsion polymer having a calculated Tg of from −20° C. to 50° C.;
   wherein said emulsion polymer is formed by emulsion copolymerization of said at least one second monoethylenically unsaturated monomer wherein 75% to 100%, by weight, of said P-acid monomer is added concurrently with said second monoethylenically unsaturated monomer during a stage comprising from 10% to 50% of the total monomer weight.

4. The method of claim 3 wherein said 75% to 100%, by weight, of said P-acid monomer is added concurrently with said second monoethylenically unsaturated monomer during a stage beginning at from 0 to 50% of total added monomer weight.

5. The method of claim 3 or claim 4 wherein said stage wherein 75% to 100%, by weight, of said P-acid monomer is added concurrently with said second monoethylenically unsaturated monomer further comprises the addition of from 0.01% to 2%, by weight, based on the weight of said emulsion polymer, second acid containing monomer.

6. A method for forming a coating comprising
   (a) forming said stable aqueous composition of claim 1;
   (b) applying said aqueous composition to a substrate; and
   (c) drying, or allowing to dry, said applied aqueous composition.

* * * * *